United States Patent
Okamoto et al.

(10) Patent No.: US 9,627,135 B2
(45) Date of Patent: Apr. 18, 2017

(54) LAMINATED CERAMIC CAPACITOR

(71) Applicant: Murata Manufacturing Co., Ltd., Nagaokakyo-shi, Kyoto-fu (JP)

(72) Inventors: Takafumi Okamoto, Nagaokakyo (JP); Shoichiro Suzuki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/945,829

(22) Filed: Nov. 19, 2015

(65) Prior Publication Data

US 2016/0071649 A1    Mar. 10, 2016

Related U.S. Application Data

(63) Continuation of application No. PCT/JP2014/061657, filed on Apr. 25, 2014.

(30) Foreign Application Priority Data

May 24, 2013 (JP) ................... 2013-109527

(51) Int. Cl.
*C04B 35/486* (2006.01)
*H01G 4/12* (2006.01)
(Continued)

(52) U.S. Cl.
CPC .......... *H01G 4/1245* (2013.01); *C04B 35/49* (2013.01); *H01G 4/012* (2013.01); *H01G 4/1209* (2013.01);
(Continued)

(58) Field of Classification Search
CPC .......................... C04B 35/486; C04B 35/4682
See application file for complete search history.

(56) References Cited

U.S. PATENT DOCUMENTS 8,507,395 B2 * 8/2013 Murakawa .......... C04B 35/4682
428/701
8,652,984 B2 * 2/2014 Endo .................... C04B 35/465
428/701
(Continued)

FOREIGN PATENT DOCUMENTS

JP    2006-187298 A    7/2005
JP    2007-234677 A    9/2007
(Continued)

OTHER PUBLICATIONS

International Search Report issued for PCT/JP2014/061657, date of mailing Aug. 5, 2014.
Written Opinion issued for PCT/JP2014/061657 dated Aug. 5, 2014.

*Primary Examiner* — Noah Wiese
(74) *Attorney, Agent, or Firm* — Arent Fox LLP (57) ABSTRACT

A ceramic capacitor having dielectric ceramic layers that include Ba, Re (Re is at least one of La, Ce, Pr, Nd, and Sm), Ti, Zr, M (M is at least one of Mg, Al, Mn, and V), Si, and optionally Sr, where at least some of the Ba, Re, Ti, and Zr and optionally Sr are in the form of a perovskite compound. Respective amounts, expressed as parts by mol, of the elements of the dielectric ceramic layers satisfy, with respect to a total of 100 of the Ti amount and the Zr amount, $0 \leq a \leq 20.0$ where a is the Sr amount; $0.5 \leq b \leq 10.0$ where b is the Re amount; $46 \leq c \leq 90$ where c is the Zr amount; $0.5 \leq d \leq 10.0$ where d is the M amount; $0.5 \leq e \leq 5.0$ where e is the Si amount; and $0.990 \leq m \leq 1.050$ where m is a ratio of a total of the Ba amount, the Sr amount, and the Re amount, to the total of the Ti amount and the Zr amount.

4 Claims, 2 Drawing Sheets

(51) Int. Cl.
  *C04B 35/49*   (2006.01)
  *H01G 4/30*    (2006.01)
  *H01G 4/012*   (2006.01)
  *H01G 4/248*   (2006.01)

(52) U.S. Cl.
  CPC ......... *H01G 4/1218* (2013.01); *H01G 4/1236* (2013.01); *H01G 4/248* (2013.01); *H01G 4/30* (2013.01); *C04B 2235/3206* (2013.01); *C04B 2235/3213* (2013.01); *C04B 2235/3215* (2013.01); *C04B 2235/3217* (2013.01); *C04B 2235/3225* (2013.01); *C04B 2235/3227* (2013.01); *C04B 2235/3229* (2013.01); *C04B 2235/3232* (2013.01); *C04B 2235/3239* (2013.01); *C04B 2235/3244* (2013.01); *C04B 2235/3262* (2013.01); *C04B 2235/3418* (2013.01); *C04B 2235/6584* (2013.01); *C04B 2235/768* (2013.01); *C04B 2235/79* (2013.01)

(56) References Cited

U.S. PATENT DOCUMENTS

| | | | |
|---|---|---|---|
| 2011/0164346 A1* | 7/2011 | Tamura | C04B 35/4682 361/321.1 |
| 2011/0235236 A1 | 9/2011 | Ikeda et al. | |
| 2013/0222971 A1* | 8/2013 | Nishimura | C04B 35/486 361/301.4 |
| 2014/0185183 A1* | 7/2014 | Park | H01G 4/1227 361/301.4 |

FOREIGN PATENT DOCUMENTS

| | | | | |
|---|---|---|---|---|
| JP | 2011-207630 A | | 10/2011 | |
| JP | 2011-207698 A | | 10/2011 | |
| JP | WO/2012/099193 | * | 7/2012 | ............. C04B 35/48 |
| TW | 200613236 A | | 5/2006 | |
| WO | WO 2012-099193 A1 | | 7/2012 | |

* cited by examiner

LAMINATED CERAMIC CAPACITOR

CROSS REFERENCE TO RELATED APPLICATIONS

The present application is a continuation of International application No. PCT/JP2014/061657, filed Apr. 25, 2014, which claims priority to Japanese Patent Application No. 2013-109527, filed May 24, 2013, the entire contents of each of which are incorporated herein by reference.

FIELD OF THE INVENTION

The present invention relates to a laminated ceramic capacitor used in a high-temperature environment, such as a laminated ceramic capacitor to be mounted on a vehicle, for example.

BACKGROUND OF THE INVENTION

The guaranteed upper limit temperature of a laminated ceramic capacitor is determined based on the electrical insulation property and the high-temperature load reliability (the lifetime in a high-temperature load test). This guaranteed temperature is generally 85° C. for common consumer equipment and 125° C. for industrial equipment which is required to have high reliability.

In recent years, among laminated ceramic capacitors for industrial equipment, a laminated ceramic capacitor used in a high-temperature environment such as a laminated ceramic capacitor to be mounted on a vehicle is being required to have the high-temperature load reliability at a higher temperature of 150 to 175° C.

A dielectric ceramic composition appropriate for use in a laminated ceramic capacitor that meets such a requirement is disclosed for example in Japanese Patent Laying-Open No. 2011-207630 (PTD 1). The dielectric ceramic composition disclosed in PTD 1 is represented by a composition formula: 100 $(Ba_{1-x}Ca_x)$ $TiO_3+aR_2O_3+bV_2O_5+cZrO_2+dMnO$ (where R is at least one kind of metal element selected from Y, La, Sm, Eu, Gd, Tb, Dy, Ho, Er, Tm, and Yb, and a, b, c, and d represent a molar ratio), and satisfies each of the conditions: $0.03 \leq x \leq 0.20$, $0.05 \leq a \leq 3.50$, $0.22 \leq b \leq 2.50$, $0.05 \leq c \leq 3.0$, and $0.01 \leq d \leq 0.30$.

It has been confirmed that the laminated ceramic capacitor in which the aforementioned dielectric ceramic composition is used has excellent high-temperature load reliability, namely has an MTTF (Mean Time To Failure) of 50 hours or more in a high-temperature load test in which a DC voltage with a field intensity of 20 V/μm is applied at a temperature of 175° C.

PTD 1: Japanese Patent Laying-Open No. 2011-207630

SUMMARY OF THE INVENTION

A laminated ceramic capacitor to be mounted on a vehicle is supposed to be used as a component of electrical equipment placed in an engine room which is a high-temperature environment all the time. For example, a laminated ceramic capacitor used for an ECU (Electronic Control Unit) or the like placed in the vicinity of an engine cylinder head, for example, can particularly be exposed to a high temperature. For such a laminated ceramic capacitor, a still higher guaranteed temperature of 200° C. or more may be required in some cases.

It has not been demonstrated, however, that a laminated ceramic capacitor in which the dielectric ceramic composition disclosed in PTD 1 is used has the high-temperature load reliability at such a high temperature.

In view of this, an object of the present invention is to provide a laminated ceramic capacitor excellent in high-temperature load reliability even in the case where the capacitor is used in a high-temperature environment, like a laminated ceramic capacitor to be mounted on a vehicle.

In order to solve the above problem, a laminated ceramic capacitor according to the present invention has improvements in a dielectric ceramic composition used in dielectric ceramic layers.

A laminated ceramic capacitor according to the present invention includes a capacitor body and a plurality of external electrodes. The capacitor body is configured to include a plurality of stacked dielectric ceramic layers and a plurality of internal electrodes formed along interfaces between the dielectric ceramic layers. The plurality of external electrodes are formed respectively at positions different from each other on an outer surface of the capacitor body, and electrically connected to the internal electrodes.

The dielectric ceramic layers include, as elements, Ba, Re (Re is at least one kind of element selected from La, Ce, Pr, Nd, and Sm), Ti, Zr, M (M is at least one kind of element selected from Mg, Al, Mn, and V), and Si, and optionally Sr.

Of the elements of the dielectric ceramic layers, at least some of the Ba, Re, Ti, and Zr and optionally Sr is in the form of a perovskite compound.

Further, respective amounts, expressed as parts by mol, of the elements included in the dielectric ceramic layers satisfy, with respect to a total of 100 of the Ti amount and the Zr amount, conditions: $0 \leq a \leq 20.0$ where a is the Sr amount; $0.5 \leq b \leq 10.0$ where b is the Re amount; $46 \leq c \leq 90$ where c is the Zr amount; $0.5 \leq d \leq 10.0$ where d is the M amount; $0.5 \leq e \leq 5.0$ where e is the Si amount; and $0.990 \leq m \leq 1.050$ where m is a ratio of a total of the Ba amount, the Sr amount, and the Re amount, to the total of the Ti amount and the Zr amount (hereinafter referred to as first conditions).

The above-described laminated ceramic capacitor has excellent high-temperature load reliability, namely has an MTTF of 100 hours or more in a high-temperature load test in which a DC voltage with a field strength of 15 V/μm is applied at a temperature of 200° C. Further, the dielectric ceramic has a dielectric constant ($\in_r$) of 70 or more.

Regarding the laminated ceramic capacitor according to the present invention, respective amounts, expressed as parts by mol, of the elements included in the dielectric ceramic layers may satisfy, with respect to a total of 100 of the Ti amount and the Zr amount, conditions: $0 \leq a \leq 20.0$ where a is the Sr amount; $0.5 \leq b \leq 5.0$ where b is the Re amount; $46 \leq c \leq 80$ where c is the Zr amount; $0.5 \leq d \leq 5.0$ where d is the M amount; $1.0 \leq e \leq 3.0$ where e is the Si amount; and $0.990 \leq m \leq 1.050$ where m is a ratio of a total of the Ba amount, the Sr amount, and the Re amount, to the total of the Ti amount and the Zr amount (hereinafter referred to as second conditions).

The above-described laminated ceramic capacitor has the above-described excellent high-temperature load reliability and further has $\in_r$ of the dielectric ceramic of 100 or more.

Moreover, regarding the laminated ceramic capacitor according to the present invention, respective amounts, expressed as parts by mol, of the elements included in the dielectric ceramic layers may satisfy, with respect to a total of 100 of the Ti amount and the Zr amount, conditions: $0 \leq a \leq 20.0$ where a is the Sr amount; $1.0 \leq b \leq 5.0$ where b is the Re amount; $60 \leq c \leq 80$ where c is the Zr amount; $1.0 \leq d \leq 5.0$ where d is the M amount; $1.0 \leq e \leq 3.0$ where e is the Si amount; and $1.010 \leq m \leq 1.040$ where m is a ratio of a total of the Ba amount, the Re amount, and the Sr amount, to the total of the Ti amount and the Zr amount (hereinafter referred to as third conditions).

The above-described laminated ceramic capacitor has more excellent high-temperature load reliability, namely has an MTTF of 150 hours or more in a high-temperature load test conducted under the above-described conditions, and has $\in_r$ of the dielectric ceramic of 100 or more.

The laminated ceramic capacitor according to the present invention has excellent high-temperature load reliability, namely has an MTTF of 100 hours or more in a high-temperature load test in which a DC voltage with a field strength of 15 V/μm is applied at a temperature of 200° C. Moreover, the dielectric ceramic has $\in_r$ of 70 or more.

DETAILED DESCRIPTION OF THE PREFERRED EMBODIMENTS

Embodiments

In the following, characteristics of the present invention will be described in further detail with reference to an embodiment of the present invention.

<Structure of Laminated Ceramic Capacitor>

Figure 1:
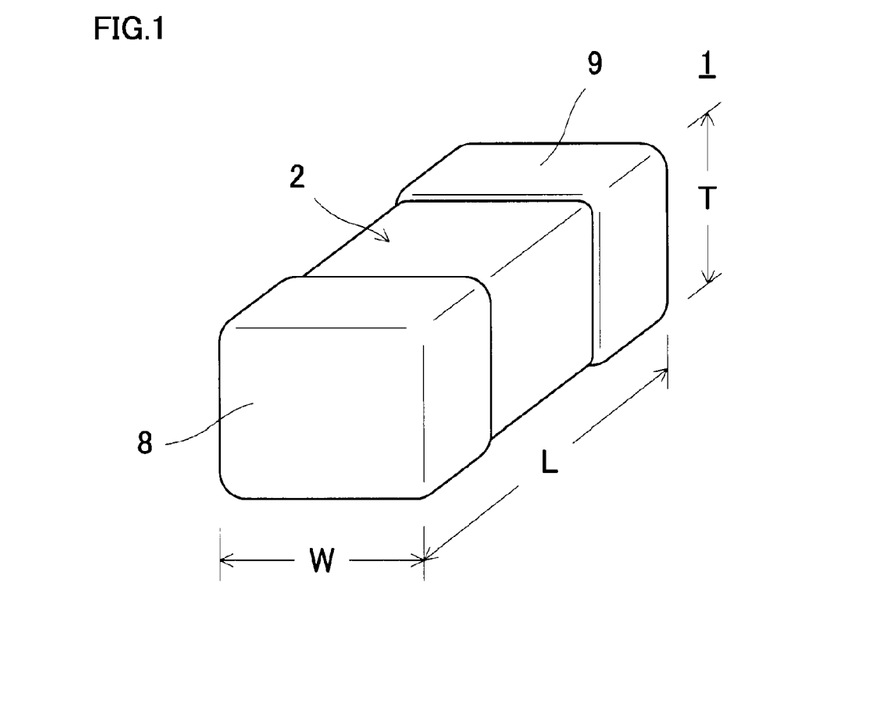
FIG. 1 is a perspective view showing an outward appearance of a laminated ceramic capacitor 1 according to an embodiment of the present invention.
Figure 2:
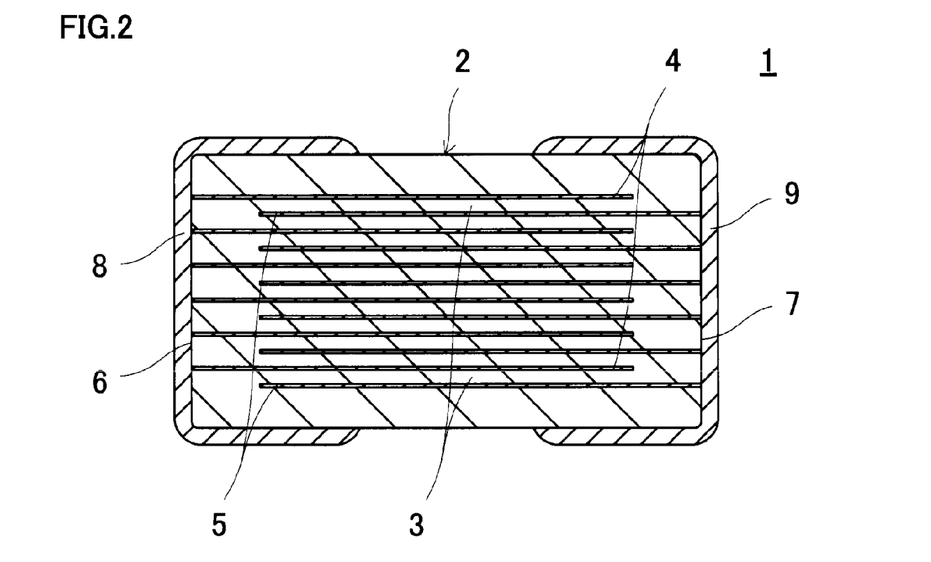
FIG. 2 is a front cross-sectional view of laminated ceramic capacitor 1 shown in FIG. 1.

A laminated ceramic capacitor 1 includes a capacitor body 2. Capacitor body 2 is configured to include a plurality of stacked dielectric ceramic layers 3, and a plurality of internal electrodes 4 and 5 formed respectively along a plurality of interfaces between a plurality of dielectric ceramic layers 3.

Internal electrodes 4 and 5 are formed to reach the outer surface of capacitor body 2. In the embodiment of the present invention, internal electrode 4 is formed to reach one end face 6 of capacitor body 2 and internal electrode 5 is formed to reach the other end face 7. Internal electrodes 4 and internal electrodes 5 are alternately arranged in capacitor body 2.

On the outer surface of capacitor body 2, specifically on end faces 6 and 7, external electrodes 8 and 9 are formed, respectively. On external electrodes 8 and 9, first plating layers made of Ni, Cu, or the like may respectively be formed as required. On the first plating layers, second plating layers made of solder, Sn, or the like may further be formed, respectively.

In such a laminated ceramic capacitor 1, the kinds of elements and a compound included in dielectric ceramic layers 3 and respective amounts of the elements satisfy conditions defined by the present invention.

<Manufacture of Laminated Ceramic Capacitor>

Next, a method of manufacturing the above-described laminated ceramic capacitor 1 will be described in the order of manufacturing steps.

A raw material powder for a dielectric ceramic composition is prepared and turned into slurry, and this slurry is formed into sheets. Thus, green sheets for dielectric ceramic layers 3 are obtained. Here, as a raw material powder for the dielectric ceramic, a raw material powder for the dielectric ceramic composition of the present invention is used, as will be detailed later herein.

As a method of manufacturing this raw material powder for the dielectric ceramic, any method may be used as long as the kinds of elements and a compound included in dielectric ceramic layers 3 and respective amounts of the elements satisfy the conditions defined by the present invention. The raw materials to be used may be in any of a variety of forms such as carbonate, oxide, hydroxide, chloride, and the like.

For example, a method of manufacturing (synthesizing) a perovskite compound powder may be a solid phase method according to which raw materials in the form of carbonates, oxides and the like are mixed and calcined into the powder. Besides this, any of a variety of known methods such as hydrothermal method may be used. Alternatively, $BaTiO_3$ or $BaZrO_3$ prepared by the hydrothermal method or the like may be mixed with various raw materials so that a composition of a desired perovskite compound is obtained, and thereafter the resultant mixture may be calcined to thereby manufacture the perovskite compound powder.

The raw material powder for the dielectric ceramic may be a mixture of $BaTiO_3$ or $BaZrO_3$ which is prepared by the hydrothermal method or the like, with various raw materials. Then, they react with each other when the capacitor body is fired, so that the perovskite compound containing Ba, Re, Ti, and Zr and optionally containing Sr may be synthesized.

On respective main surfaces of specific ones of the obtained green sheets, internal electrodes 4 and 5 are formed. As a conductive material forming internal electrodes 4 and 5, Ni, Ni alloy, Cu, Cu alloy or the like may be used. Usually, Ni or Ni alloy is used. These internal electrodes 4 and 5 are usually formed from a conductive paste containing the aforementioned conductive material powder, through screen printing or transfer printing. The method of forming internal electrodes 4 and 5 is not limited to this, and any method may be used to form internal electrodes 4 and 5.

A required number of green sheets for dielectric ceramic layers 3 each having internal electrodes 4 or 5 formed thereon are stacked, and these green sheets are held between an appropriate number of green sheets on which the internal electrodes are not formed. The resultant stack is thermo-compressed, and thus a raw capacitor body is obtained.

This raw capacitor body is fired at a predetermined temperature in a predetermined reducing atmosphere, and thus sintered capacitor body 2 is obtained.

On both end faces 6 and 7 of sintered capacitor body 2, external electrodes 8 and 9 are formed so that the external electrodes are electrically connected to internal electrodes 4 and 5, respectively. As a conductive material forming these external electrodes 8 and 9, Ni, Ni alloy, Cu, Cu alloy, Ag, Ag alloy, or the like may be used. Usually, Cu or Cu alloy is used. External electrodes 8 and 9 are usually formed by applying a conductive paste, which is obtained by adding a glass frit to a conductive material powder, onto both end faces 6 and 7 of capacitor body 2, and baking the paste.

It should be noted that the conductive paste which is to form external electrodes 8 and 9 may be applied to the raw capacitor body before being fired, and baked simultaneously with firing which is done for obtaining capacitor body 2.

Next, external electrodes 8 and 9 are plated with Ni, Cu or the like as required, and thus first plating layers are formed on these electrodes. These first plating layers are also plated with Sn, solder or the like, and thus second plating layers are formed thereon. In this way, laminated ceramic capacitor 1 is completed.

Experimental Examples

In the following, the present invention will more specifically be described based on experimental examples. These experimental examples are also provided for the sake of giving a basis on which conditions to be met by the amounts of the elements included in the dielectric ceramic layers of the laminated ceramic capacitor of the present invention, or preferred conditions to be met by the amounts of the elements are defined. In the experimental examples, laminated ceramic capacitors as shown in FIGS. 1 and 2 were prepared as samples.

<Manufacture of Raw Material Powder for Dielectric Ceramic>

As a raw material for Ba forming the perovskite compound included in the dielectric ceramic layers, a $BaCO_3$ powder was prepared. As a raw material for Sr forming the perovskite compound, an $SrCO_3$ powder was prepared. As raw materials for Re forming the perovskite compound, $La_2O_3$, $CeO_2$, $Pr_6O_{11}$, $Nd_2O_3$, and $Sm_2O_3$ powders were prepared. As a raw material for Ti forming the perovskite compound, a $TiO_2$ powder was prepared. As a raw material for Zr forming the perovskite compound, a $ZrO_2$ powder was prepared. The powders each having a purity of 99 wt % or more were used.

These powders were each weighed and they were blended so that a ratio m of the total of the Ba amount, the Sr amount, and the Re amount, to the total of the Ti amount and the Zr amount, as well as the Sr amount a, the Re amount b, the Zr amount c, the Ba amount, and the Ti amount met the values shown in Tables 1 and 2, where the amount of each element is expressed as parts by mol. When the powders were blended, the amounts of the blended powders were corrected depending on the purity of each powder.

These blended raw material powders were wet-mixed with a ball mill to be uniformly dispersed, thereafter dried, and disintegrated, and accordingly an adjusted powder was obtained. The obtained adjusted powder was calcined at 1050° C., and accordingly a perovskite compound powder was obtained.

Meanwhile, as raw materials for M included in the dielectric ceramic layers, $MgCO_3$, $Al_2O_3$, $MnCO_3$, and $V_2O_5$ powders were prepared. As a raw material for Si, an $SiO_2$ powder was prepared. The powders each having a purity of 99 wt % or more were used.

Next, these powders and the above-described perovskite compound powder were each weighed and they were blended so that the M amount d and the Si amount e met the values shown in Tables 1 and 2 with respect to a total of 100 of the Ti amount and the Zr amount, where the amount of each element is expressed as parts by mol. When the powders were blended, the amounts of the blended powders were corrected depending on the purity of each powder.

It should be noted that in order to adjust ratio m of the total of the Ba amount, the Sr amount, and the Re amount to the total of the Ti amount and the Zr amount in the perovskite compound, the raw materials such as $BaCO_3$, $SrCO_3$, $TiO_2$, and $ZrO_2$ may be added in the stage of mixing the perovskite compound powder with the raw material for M and the raw material for Si.

These blended raw material powders were wet-mixed with a ball mill to be uniformly dispersed, thereafter dried, and disintegrated, and accordingly a raw material powder for the dielectric ceramic was obtained.

$ZrO_2$ other than the one included in the weighed raw materials may externally be introduced, in such a case for example where YSZ (Yttria Stabilized Zirconia) balls are used as media in the process of the above-described wet-mixing. In this case, the amount of the $ZrO_2$ powder to be blended is adjusted, taking into consideration the amount of the externally introduced $ZrO_2$, so that the compositions shown in Tables 1 and 2 are satisfied.

It has separately been confirmed that although Ca and Hf may be included as inevitable impurities in the raw material powder for the dielectric ceramic, they have no influence on the effects of the present invention.

The obtained raw material powder for the dielectric ceramic was dissolved in acid and subjected to an ICP emission spectrochemical analysis. "ICP emission spectrochemical analysis" is an abbreviation for Inductively Coupled Plasma emission spectrochemical analysis.

As a result of the analysis, it was confirmed that the raw material powder for the dielectric ceramic had the compositions substantially identical to the compositions shown in Tables 1 and 2.

<Manufacture of Laminated Ceramic Capacitor>

To the raw material powders for the dielectric ceramic, polyvinyl butyral-based binder, plasticizer, and organic solvent such as ethanol were added, they were wet-mixed with a ball mill, and accordingly a slurry containing the dielectric ceramic composition was obtained. The slurries were formed into sheets on carrier films made of polyethylene terephthalate. Accordingly, green sheets including the dielectric ceramic composition were obtained.

On the obtained green sheets, internal electrode patterns were printed using a conductive paste made from Ni as a conductive material. The green sheets were stacked together so that the green sheets and corresponding electrode patterns face each other to form a plurality of capacitances. On the top and bottom surfaces of the resultant stack, an appropriate number of ceramic green sheets without the internal electrode pattern formed thereon were stacked, this was thermocompressed, and thus a raw capacitor body was obtained.

The obtained raw capacitor body was held in the atmosphere at a temperature of 290° C. for three hours to burn the binder. After the binder was burned, the capacitor body was held in a reducing atmosphere at a temperature of 1150 to 1250° C. for two hours to fire the capacitor body, and the sintered capacitor body was obtained. For the reducing atmosphere, a gas mixture of $N_2$—$H_2$—$H_2O$ was used. The oxygen partial pressure $PO_2$ was set to $10^{-12}$ to $10^{-9}$ MPa at which Ni contained in the internal electrodes is not oxidized at the aforementioned temperature.

To both end faces of the sintered capacitor body, a conductive paste containing Cu as a conductive material and containing a $B_2O_3$—$SiO_2$—BaO-based glass frit was applied, and baked in an $N_2$ atmosphere at 800° C. Accordingly, external electrodes electrically connected to the internal electrodes were formed.

After this, through barrel plating, an Ni plating layer (first plating layer) was formed on the surface of the external electrode, and an Sn plating layer (second plating layer) was further formed on the Ni plating layer.

Through the above-described steps, laminated ceramic capacitors for samples having sample numbers 1 to 68 were obtained.

The laminated ceramic capacitor for each sample thus obtained had the outer shape dimensions, namely a width of 1.0 mm, a length of 2.0 mm, and a thickness of 1.0 mm. The number of dielectric ceramic layers for obtaining a capacitance was 85, and the area of a counter electrode per layer was 1.6 mm².

The capacitor body of the obtained laminated ceramic capacitor for each sample from which the external electrodes were removed was dissolved in acid and subjected to an ICP emission spectrochemical analysis. It should be noted that the method of dissolving the capacitor body into a solution is not particularly limited.

According to the above-described method, the dielectric ceramic layers and the internal electrodes were simultaneously dissolved, and therefore, in addition to the elements included in the dielectric ceramic layers, the elements included in the internal electrodes were detected by the analysis. In view of this, the results of the ICP emission spectrochemical analysis, from which the known elements included in the internal electrodes were excluded, were regarded as the results of the ICP emission spectrochemical analysis of the solution into which the dielectric ceramic layers were dissolved. The accordingly detected elements expressed as parts by mol were regarded as the amounts of the elements included in the dielectric ceramic layers.

As a result, it was confirmed that the dielectric ceramic layers had the compositions substantially identical to the compositions shown in Tables 1 and 2.

Therefore, the kinds of the elements included in the dielectric ceramic layers of the laminated ceramic capacitor of the present invention, as well as the conditions to be met by the amounts of the elements or preferred conditions to be met by the amounts of the elements are defined based on the compositions shown in Tables 1 and 2.

<Measurement of the Thickness of the Dielectric Ceramic Layer>

For the samples with sample numbers 1 to 68 produced in the above-described manner, three laminated ceramic capacitors were prepared for each sample.

The three laminated ceramic capacitors for each sample were kept at a posture at which the width (W) direction goes along the vertical direction, the periphery of the sample was encased in a resin, and the LT surface defined by the length (L) and the thickness (T) of the sample was exposed from the resin. After this, a grinder was used to grind the LT surface of each sample to approximately a half of the depth in the width (W) direction of each sample. In order to eliminate elongation of the internal electrodes due to grinding, the ground surface was treated by ion milling.

Figure 3:
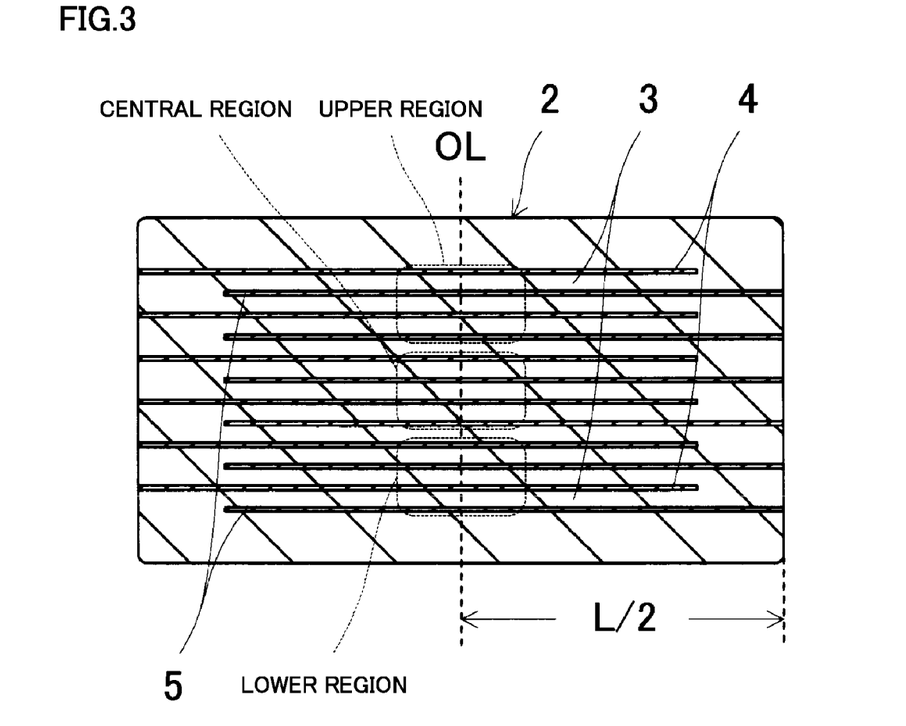
FIG. 3 is a diagram for illustrating how to measure the thickness of a dielectric ceramic layer 3 of laminated ceramic capacitor 1 shown in FIG. 1.

For the obtained sample after being ground, a line OL (orthogonal line) orthogonal to dielectric ceramic layers 3 was drawn at the position of approximately a half of the dimension in the L direction on the LT cross section. The region where dielectric ceramic layers 3 contributing to obtaining a capacitance were stacked was divided equally into three regions along the thickness (T) direction, namely an upper region, a central region, and a lower region.

Then, in each region except for the outermost dielectric ceramic layers 3 and a portion where two or more dielectric ceramic layers 3 seemed to be one continuous layer due to lack of the internal electrodes, respective thicknesses of ten layers in a central portion of each region were measured along the aforementioned orthogonal line OL, and the average thickness was determined Namely, ten layers in each of the three regions of the three samples were measured, and therefore, the number of data for determining the average was 90. As a result, in each of the samples with sample numbers 1 to 68, the thickness of the dielectric ceramic layer was 10.0 μm. The thickness of the dielectric ceramic layer was measured with a scanning electron microscope.

<Measurement of $\in_r$ of Dielectric Ceramic>

20 laminated ceramic capacitors were prepared for each of the samples with sample numbers 1 to 68 produced in the above-described manner.

The capacitance (C) of the 20 laminated ceramic capacitors for each sample was measured with an impedance analyzer (HP4194A manufactured by Agilent Technologies) at a temperature of 25±2° C., by applying an AC voltage with a voltage of 1 $V_{rms}$, and a frequency of 1 kHz, and the average was determined. From the obtained average of C, the internal electrode area, and the thickness of the dielectric ceramic layer obtained in the above-described manner, $\in_r$ of the dielectric ceramic was calculated.

<Measurement of High-Temperature Load Reliability of the Laminated Ceramic Capacitor>

100 laminated ceramic capacitors were prepared for each of the samples with sample numbers 1 to 68 produced in the above-described manner.

For the 100 laminated ceramic capacitors per sample, it was supposed that the capacitors were to be used for an ECU placed in the vicinity of an engine cylinder head, and a high-temperature load test was conducted at a temperature of 200° C. with a DC voltage of 150 V applied, and a change with time of the resistance values of the capacitors was measured. The strength of the field applied to the dielectric ceramic layers calculated from the obtained thickness of the dielectric ceramic layer and the applied voltage is 15 kV/mm. For the 100 laminated ceramic capacitors per sample, the time having elapsed when the resistance value became 1 MΩ or less was defined as a failure time, and the MTTF of each sample was determined from a Weibull analysis of the failure time.

The kinds of the elements included in the fired dielectric ceramic layers, the amounts of the elements, $\in_r$, and the result of measurement of MTTF by the high-temperature load test are shown collectively in Tables 1 and 2.

TABLE 1

| | | | | | | | | | | | | | | | | | | |
|---|---|---|---|---|---|---|---|---|---|---|---|---|---|---|---|---|---|---|
| | | | | perovskite compound | | | | | | | | | | | | | | |
| | | Ba | Sr | | Re (parts by mol) | | | | | Ti | Zr | | M (parts by mol) | | | | Si | |
| Sample | | (parts | (parts | | | | b | | | (parts | (parts | | | d | | | (parts | MTTF |
| No. | m | by mol) | by mol) a | La | Ce | Pr | Nd | Sm | Re ttl | by mol) | by mol) c | Mg | Al | Mn | V | M ttl | by mol) e | $\in_r$ | (time) |
| *1 | 1.020 | 91.8 | 10.0 | 0.2 | — | — | — | — | 0.2 | 40 | 60 | 3.0 | — | — | — | 3.0 | 2.0 | 289 | 60 |
| 2 | 1.020 | 91.5 | 10.0 | 0.5 | — | — | — | — | 0.5 | 40 | 60 | 3.0 | — | — | — | 3.0 | 2.0 | 252 | 103 |
| 3 | 1.020 | 91.25 | 10.0 | 0.75 | — | — | — | — | 0.75 | 40 | 60 | 3.0 | — | — | — | 3.0 | 2.0 | 232 | 121 |
| 4 | 1.020 | 91.0 | 10.0 | 1.0 | — | — | — | — | 1.0 | 40 | 60 | 3.0 | — | — | — | 3.0 | 2.0 | 219 | 188 |
| 5 | 1.020 | 90.0 | 10.0 | 2.0 | — | — | — | — | 2.0 | 40 | 60 | 3.0 | — | — | — | 3.0 | 2.0 | 199 | 206 |
| 6 | 1.020 | 87.0 | 10.0 | 5.0 | — | — | — | — | 5.0 | 40 | 60 | 3.0 | — | — | — | 3.0 | 2.0 | 135 | 233 |
| 7 | 1.020 | 82.0 | 10.0 | 10.0 | — | — | — | — | 10.0 | 40 | 60 | 3.0 | — | — | — | 3.0 | 2.0 | 70 | 299 |
| *8 | 1.020 | 77.0 | 10.0 | 15.0 | — | — | — | — | 15.0 | 40 | 60 | 3.0 | — | — | — | 3.0 | 2.0 | 49 | 301 |

TABLE 1-continued

| Sample No. | m | Ba (parts by mol) | Sr (parts by mol) | a | \multicolumn{6}{c}{Re (parts by mol) b} | Ti (parts by mol) | Zr (parts by mol) c | \multicolumn{5}{c}{M (parts by mol) d} | Si (parts by mol) e | εr | MTTF (time) |
|---|---|---|---|---|---|---|---|---|---|---|---|---|---|---|---|---|---|---|---|---|
| | | | | | La | Ce | Pr | Nd | Sm | Re ttl | | | Mg | Al | Mn | V | M ttl | | | |
| 9 | 1.020 | 87.0 | 10.0 | 3.0 | 1.0 | 1.0 | — | — | 5.0 | 40 | 60 | 3.0 | — | — | — | 3.0 | 2.0 | 132 | 234 |
| 10 | 1.020 | 87.0 | 10.0 | 1.0 | 3.0 | — | 1.0 | — | 5.0 | 40 | 60 | 3.0 | — | — | — | 3.0 | 2.0 | 149 | 212 |
| 11 | 1.020 | 87.0 | 10.0 | 1.0 | — | 3.0 | — | 1.0 | 5.0 | 40 | 60 | 3.0 | — | — | — | 3.0 | 2.0 | 131 | 204 |
| *12 | 1.020 | 77.0 | 10.0 | 5.0 | 5.0 | 5.0 | — | — | 15.0 | 40 | 60 | 3.0 | — | — | — | 3.0 | 2.0 | 42 | 303 |
| *13 | 1.020 | 77.0 | 10.0 | 5.0 | — | — | 5.0 | 5.0 | 15.0 | 40 | 60 | 3.0 | — | — | — | 3.0 | 2.0 | 33 | 309 |
| 14 | 1.020 | 97.0 | 0.0 | 5.0 | — | — | — | — | 5.0 | 40 | 60 | 3.0 | — | — | — | 3.0 | 2.0 | 199 | 184 |
| 15 | 1.020 | 94.0 | 3.0 | 5.0 | — | — | — | — | 5.0 | 40 | 60 | 3.0 | — | — | — | 3.0 | 2.0 | 188 | 199 |
| 16 | 1.020 | 92.0 | 5.0 | 5.0 | — | — | — | — | 5.0 | 40 | 60 | 3.0 | — | — | — | 3.0 | 2.0 | 182 | 200 |
| 17 | 1.020 | 77.0 | 20.0 | 5.0 | — | — | — | — | 5.0 | 40 | 60 | 3.0 | — | — | — | 3.0 | 2.0 | 103 | 287 |
| *18 | 1.020 | 67.0 | 30.0 | 5.0 | — | — | — | — | 5.0 | 40 | 60 | 3.0 | — | — | — | 3.0 | 2.0 | 44 | 299 |
| 19 | 1.020 | 92.0 | 5.0 | — | 5.0 | — | — | — | 5.0 | 40 | 60 | 3.0 | — | — | — | 3.0 | 2.0 | 184 | 201 |
| 20 | 1.020 | 92.0 | 5.0 | — | — | 5.0 | — | — | 5.0 | 40 | 60 | 3.0 | — | — | — | 3.0 | 2.0 | 172 | 195 |
| 21 | 1.020 | 92.0 | 5.0 | — | — | — | 5.0 | — | 5.0 | 40 | 60 | 3.0 | — | — | — | 3.0 | 2.0 | 166 | 193 |
| 22 | 1.020 | 92.0 | 5.0 | — | — | — | — | 5.0 | 5.0 | 40 | 60 | 3.0 | — | — | — | 3.0 | 2.0 | 154 | 186 |
| *23 | 1.020 | 87.0 | 10.0 | 5.0 | — | — | — | — | 5.0 | 70 | 30 | 3.0 | — | — | — | 3.0 | 2.0 | 1014 | 35 |
| 24 | 1.020 | 87.0 | 10.0 | 5.0 | — | — | — | — | 5.0 | 54 | 46 | 3.0 | — | — | — | 3.0 | 2.0 | 371 | 105 |
| 25 | 1.020 | 87.0 | 10.0 | 5.0 | — | — | — | — | 5.0 | 50 | 50 | 3.0 | — | — | — | 3.0 | 2.0 | 305 | 129 |
| 26 | 1.020 | 87.0 | 10.0 | 5.0 | — | — | — | — | 5.0 | 30 | 70 | 3.0 | — | — | — | 3.0 | 2.0 | 138 | 304 |
| 27 | 1.020 | 87.0 | 10.0 | 5.0 | — | — | — | — | 5.0 | 20 | 80 | 3.0 | — | — | — | 3.0 | 2.0 | 101 | 427 |
| 28 | 1.020 | 87.0 | 10.0 | 5.0 | — | — | — | — | 5.0 | 10 | 90 | 3.0 | — | — | — | 3.0 | 2.0 | 77 | 575 |
| *29 | 1.020 | 87.0 | 10.0 | 5.0 | — | — | — | — | 5.0 | 0 | 100 | 3.0 | — | — | — | 3.0 | 2.0 | 47 | 752 |
| *30 | 1.020 | 87.0 | 10.0 | 5.0 | — | — | — | — | 5.0 | 40 | 60 | 0.3 | — | — | — | 0.3 | 2.0 | *a | — |
| 31 | 1.020 | 87.0 | 10.0 | 5.0 | — | — | — | — | 5.0 | 40 | 60 | 0.5 | — | — | — | 0.5 | 2.0 | 182 | 132 |
| 32 | 1.020 | 87.0 | 10.0 | 5.0 | — | — | — | — | 5.0 | 40 | 60 | 1.0 | — | — | — | 1.0 | 2.0 | 146 | 167 |
| 33 | 1.020 | 87.0 | 10.0 | 5.0 | — | — | — | — | 5.0 | 40 | 60 | 2.0 | — | — | — | 2.0 | 2.0 | 142 | 199 |
| 34 | 1.020 | 87.0 | 10.0 | 5.0 | — | — | — | — | 5.0 | 40 | 60 | 5.0 | — | — | — | 5.0 | 2.0 | 121 | 172 |
| 35 | 1.020 | 87.0 | 10.0 | 5.0 | — | — | — | — | 5.0 | 40 | 60 | 10.0 | — | — | — | 10.0 | 2.0 | 97 | 121 |
| *36 | 1.020 | 87.0 | 10.0 | 5.0 | — | — | — | — | 5.0 | 40 | 60 | 15.0 | — | — | — | 15.0 | 2.0 | *b | — |

*a: became semiconductor
*b: insufficient sintering

TABLE 2

| Sample No. | m | Ba (parts by mol) | Sr (parts by mol) | a | \multicolumn{6}{c}{Re (parts by mol) b} | Ti (parts by mol) | Zr (parts by mol) c | \multicolumn{5}{c}{M (parts by mol) d} | Si (parts by mol) e | εr | MTTF (time) |
|---|---|---|---|---|---|---|---|---|---|---|---|---|---|---|---|---|---|---|---|---|
| | | | | | La | Ce | Pr | Nd | Sm | Re ttl | | | Mg | Al | Mn | V | M ttl | | | |
| *37 | 0.980 | 83.0 | 10.0 | 5.0 | — | — | — | — | 5.0 | 40 | 60 | 3.0 | — | — | — | 3.0 | 2.0 | *a | — |
| 38 | 0.990 | 84.0 | 10.0 | 5.0 | — | — | — | — | 5.0 | 40 | 60 | 3.0 | — | — | — | 3.0 | 2.0 | 162 | 103 |
| 39 | 1.000 | 85.0 | 10.0 | 5.0 | — | — | — | — | 5.0 | 40 | 60 | 3.0 | — | — | — | 3.0 | 2.0 | 153 | 111 |
| 40 | 1.010 | 86.0 | 10.0 | 5.0 | — | — | — | — | 5.0 | 40 | 60 | 3.0 | — | — | — | 3.0 | 2.0 | 150 | 201 |
| 41 | 1.030 | 88.0 | 10.0 | 5.0 | — | — | — | — | 5.0 | 40 | 60 | 3.0 | — | — | — | 3.0 | 2.0 | 130 | 212 |
| 42 | 1.040 | 89.0 | 10.0 | 5.0 | — | — | — | — | 5.0 | 40 | 60 | 3.0 | — | — | — | 3.0 | 2.0 | 119 | 163 |
| 43 | 1.050 | 90.0 | 10.0 | 5.0 | — | — | — | — | 5.0 | 40 | 60 | 3.0 | — | — | — | 3.0 | 2.0 | 105 | 115 |
| *44 | 1.060 | 91.0 | 10.0 | 5.0 | — | — | — | — | 5.0 | 40 | 60 | 3.0 | — | — | — | 3.0 | 2.0 | *b | — |
| 45 | 1.020 | 87.0 | 10.0 | 3.0 | 2.0 | — | — | — | 5.0 | 40 | 60 | 3.0 | — | — | — | 3.0 | 2.0 | 132 | 192 |
| 46 | 1.020 | 87.0 | 10.0 | 3.0 | — | 2.0 | — | — | 5.0 | 40 | 60 | 3.0 | — | — | — | 3.0 | 2.0 | 123 | 186 |
| 47 | 1.020 | 87.0 | 10.0 | 3.0 | — | — | 2.0 | — | 5.0 | 40 | 60 | 3.0 | — | — | — | 3.0 | 2.0 | 136 | 193 |
| 48 | 1.020 | 87.0 | 10.0 | 3.0 | — | — | — | 2.0 | 5.0 | 40 | 60 | 3.0 | — | — | — | 3.0 | 2.0 | 123 | 183 |
| 49 | 1.020 | 87.0 | 10.0 | 1.0 | 1.0 | 1.0 | 1.0 | 1.0 | 5.0 | 40 | 60 | 3.0 | — | — | — | 3.0 | 2.0 | 134 | 172 |
| *50 | 1.020 | 87.0 | 10.0 | 5.0 | — | — | — | — | 5.0 | 40 | 60 | 0.1 | — | 0.1 | — | 0.2 | 2.0 | *a | — |
| *51 | 1.020 | 87.0 | 10.0 | 5.0 | — | — | — | — | 5.0 | 40 | 60 | — | 0.1 | — | 0.1 | 0.2 | 2.0 | *a | — |
| 52 | 1.020 | 87.0 | 10.0 | 5.0 | — | — | — | — | 5.0 | 40 | 60 | — | — | 0.5 | — | 0.5 | 2.0 | 154 | 130 |
| 53 | 1.020 | 87.0 | 10.0 | 5.0 | — | — | — | — | 5.0 | 40 | 60 | 0.2 | 0.1 | 0.2 | — | 0.5 | 2.0 | 153 | 121 |
| 54 | 1.020 | 87.0 | 10.0 | 5.0 | — | — | — | — | 5.0 | 40 | 60 | — | 0.1 | 0.2 | 0.2 | 0.5 | 2.0 | 164 | 132 |
| 55 | 1.020 | 87.0 | 10.0 | 5.0 | — | — | — | — | 5.0 | 40 | 60 | — | 3.0 | — | — | 3.0 | 2.0 | 123 | 232 |
| 56 | 1.020 | 87.0 | 10.0 | 5.0 | — | — | — | — | 5.0 | 40 | 60 | — | — | 3.0 | — | 3.0 | 2.0 | 124 | 212 |
| 57 | 1.020 | 87.0 | 10.0 | 5.0 | — | — | — | — | 5.0 | 40 | 60 | — | — | — | 3.0 | 3.0 | 2.0 | 132 | 221 |
| 58 | 1.020 | 87.0 | 10.0 | 5.0 | — | — | — | — | 5.0 | 40 | 60 | 1.0 | 1.0 | 1.0 | — | 3.0 | 2.0 | 136 | 209 |
| 59 | 1.020 | 87.0 | 10.0 | 5.0 | — | — | — | — | 5.0 | 40 | 60 | 5.0 | 5.0 | — | — | 10.0 | 2.0 | 94 | 123 |
| *60 | 1.020 | 87.0 | 10.0 | 5.0 | — | — | — | — | 5.0 | 40 | 60 | — | 2.3 | 5.0 | 5.0 | 12.3 | 2.0 | *b | — |
| *61 | 1.020 | 87.0 | 10.0 | 5.0 | — | — | — | — | 5.0 | 40 | 60 | 5.0 | 5.0 | — | 2.5 | 12.5 | 2.0 | *b | — |
| *62 | 1.020 | 87.0 | 10.0 | 5.0 | — | — | — | — | 5.0 | 40 | 60 | — | 5.0 | 2.5 | 5.0 | 12.5 | 2.0 | *b | — |
| *63 | 1.020 | 87.0 | 10.0 | 5.0 | — | — | — | — | 5.0 | 30 | 70 | 3.0 | — | — | — | 3.0 | 0.2 | *b | — |
| 64 | 1.020 | 87.0 | 10.0 | 5.0 | — | — | — | — | 5.0 | 30 | 70 | 3.0 | — | — | — | 3.0 | 0.5 | 77 | 201 |
| 65 | 1.020 | 87.0 | 10.0 | 5.0 | — | — | — | — | 5.0 | 30 | 70 | 3.0 | — | — | — | 3.0 | 1.0 | 102 | 210 |
| 66 | 1.020 | 87.0 | 10.0 | 5.0 | — | — | — | — | 5.0 | 30 | 70 | 3.0 | — | — | — | 3.0 | 3.0 | 138 | 289 |

TABLE 2-continued

| Sample No. | m | Ba (parts by mol) | Sr (parts by mol) a | Re (parts by mol) b | | | | | | Ti (parts by mol) | Zr (parts by mol) c | M (parts by mol) d | | | | | Si (parts by mol) e | $\epsilon_r$ | MTTF (time) |
|---|---|---|---|---|---|---|---|---|---|---|---|---|---|---|---|---|---|---|---|
| | | | | La | Ce | Pr | Nd | Sm | Re ttl | | | Mg | Al | Mn | V | M ttl | | | |
| 67 | 1.020 | 87.0 | 10.0 | 5.0 | — | — | — | — | 5.0 | 30 | 70 | 3.0 | — | — | — | 3.0 | 5.0 | 72 | 243 |
| *68 | 1.020 | 87.0 | 10.0 | 5.0 | — | — | — | — | 5.0 | 30 | 70 | 3.0 | — | — | — | 3.0 | 6.0 | 43 | 232 |

*a: became semiconductor
*b: insufficient sintering

In Tables 1 and 2, the samples having the sample numbers to which * is attached are samples that do not satisfy the conditions to be met by the amounts of the elements included in the dielectric ceramic layers of the laminated ceramic capacitor of the present invention.

As shown in Tables 1 and 2, it has been confirmed that each sample satisfying the first conditions to be met by the amounts of the elements included in the dielectric ceramic layers has excellent high-temperature load reliability, namely has an MTTF of 100 hours or more in a high-temperature load test conducted under the above-described conditions, and has $\epsilon_r$ of the dielectric ceramic of 70 or more.

Further, each sample satisfying the second conditions to be met by the amounts of the elements included in the dielectric ceramic layers has the aforementioned excellent high-temperature load reliability and further has $\epsilon_r$ of the dielectric ceramic of 100 or more, and is therefore preferable.

Furthermore, each sample satisfying the third conditions to be met by the amounts of the elements included in the dielectric ceramic layers has more excellent high-temperature load reliability, namely has an MTTF of 150 hours or more in a high-temperature load test conducted under the above-described conditions, and has $\epsilon_r$ of the dielectric ceramic of 100 or more, and is therefore more preferable.

In contrast, it has been confirmed that the samples that satisfy none of the first to third conditions to be met by the amounts of the elements included in the dielectric ceramic layers exhibit undesirable results regarding at least any of the high-temperature load reliability and $\epsilon_r$.

Regarding the above-described experimental examples, in order to analyze the amounts of the elements included in the dielectric ceramic layers, the capacitor body of the laminated ceramic capacitor of each sample from which the external electrodes had been removed was dissolved in acid, and the results of the ICP emission spectrochemical analysis, from which the known elements included in the internal electrodes were excluded, were regarded as the results of the ICP emission spectrochemical analysis of the solution into which the dielectric ceramic layers were dissolved.

Alternatively, a method according to which the dielectric ceramic layers are peeled off from the capacitor body, for example, may be used to separate and remove the dielectric ceramic layers from the internal electrodes. After this, the ceramic layers may be dissolved in acid and subjected to an ICP emission spectrochemical analysis.

It should be noted that the present invention is not limited to the above-described embodiments. Rather, a variety of applications or variations are possible within the scope of the present invention, in terms of the number of the dielectric ceramic layers or internal electrode layers that form the capacitor body, or the composition of the dielectric ceramic.

REFERENCE SIGNS LIST 1 laminated ceramic capacitor; 2 capacitor body; 3 dielectric ceramic layer; 4, 5 internal electrode; 6, 7 end face of capacitor body; 8, 9 external electrode

The invention claimed is:
1. A laminated ceramic capacitor comprising:
a capacitor body including a plurality of stacked dielectric ceramic layers and a plurality of internal electrodes along interfaces between said dielectric ceramic layers; and
a plurality of external electrodes respectively at positions different from each other on an outer surface of said capacitor body, and electrically connected to said internal electrodes,
said dielectric ceramic layers including Ba, Re, Ti, Zr, M, Si, and optionally Sr, wherein
Re is at least one kind of element selected from La, Ce, Pr, Nd, and Sm,
M is at least one kind of element selected from Mg, Al, Mn, and V,
respective amounts, expressed as parts by mol, of elements included in said dielectric ceramic layers satisfy, with respect to a total of 100 of a Ti amount and a Zr amount:
$0 \leq a \leq 20.0$ where a is an Sr amount,
$1.0 \leq b \leq 5.0$ where b is an Re amount,
$60 \leq c \leq 80$ where c is the Zr amount,
$1.0 \leq d \leq 5.0$ where d is an M amount,
$1.0 \leq e \leq 3.0$ where e is an Si amount, and
$1.010 \leq m \leq 1.040$ where m is a ratio of a total of a Ba amount, the Sr amount, and the Re amount, to the total of the Ti amount and the Zr amount.
2. The laminated ceramic capacitor according to claim 1, wherein the dielectric ceramic layers have a dielectric constant of 100 or more.
3. A laminated ceramic capacitor comprising:
a capacitor body including a plurality of stacked dielectric ceramic layers and a plurality of internal electrodes along interfaces between said dielectric ceramic layers, and
a plurality of external electrodes respectively at positions different from each other on an outer surface of said capacitor body, and electrically connected to said internal electrodes,
said dielectric ceramic layers including Ba, Re, Ti, Zr, M, Si, and optionally Sr, wherein
at least some of the Ba, Re, Ti, Zr and optionally Sr in said dielectric ceramic layers is in the form of a perovskite compound,
Re is at least one kind of element selected from La, Ce, Pr, Nd, and Sm,
M is at least one kind of element selected from Mg, Al, Mn, and V, respective amounts, expressed as parts by mol, of elements included in said dielectric ceramic layers satisfy, with respect to a total of 100 of a Ti amount and a Zr amount:

$0 \leq a \leq 20.0$ where a is an Sr amount,
$1.0 \leq b \leq 5.0$ where b is an Re amount,
$60 \leq c \leq 80$ where c is the Zr amount,
$1.0 \leq d \times 5.0$ where d is an M amount,
$1.0 \leq e \leq 3.0$ where e is an Si amount, and
$1.010 \leq m \leq 1.040$ where m is a ratio of a total of a Ba amount, the Sr amount, and the Re amount, to the total of the Ti amount and the Zr amount.

4. The laminated ceramic capacitor according to claim 3, wherein the dielectric ceramic layers have a dielectric constant of 100 or more.

* * * * *